United States Patent
Chen et al.

(10) Patent No.: US 8,528,090 B2
(45) Date of Patent: Sep. 3, 2013

(54) SYSTEMS AND METHODS FOR CREATING CUSTOMIZED CONFIDENCE BANDS FOR USE IN MALWARE DETECTION

(75) Inventors: Joseph Chen, Los Angeles, CA (US); Jamie Jooyoung Park, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 445 days.

(21) Appl. No.: 12/830,286

(22) Filed: Jul. 2, 2010

(65) Prior Publication Data

US 2012/0005751 A1    Jan. 5, 2012

(51) Int. Cl.
*G06F 21/00*    (2006.01)

(52) U.S. Cl.
USPC .......................................................... 726/24

(58) Field of Classification Search
USPC .......................................................... 726/24
See application file for complete search history.

(56) References Cited

U.S. PATENT DOCUMENTS

| | | | | |
|---|---|---|---|---|
| 7,472,420 B1 * | 12/2008 | Pavlyushchik | ................... | 726/24 |
| 7,845,013 B2 * | 11/2010 | Bhogal et al. | ................... | 726/27 |
| 2006/0212930 A1 | 9/2006 | Shull et al. | | |
| 2006/0253581 A1 | 11/2006 | Dixon et al. | | |
| 2007/0100643 A1 * | 5/2007 | Paulus et al. | ....................... | 705/1 |
| 2009/0171623 A1 * | 7/2009 | Kiefer | ............................ | 702/181 |
| 2009/0328209 A1 * | 12/2009 | Nachenberg | .................... | 726/22 |
| 2011/0093939 A1 * | 4/2011 | Barbour et al. | .................... | 726/7 |

FOREIGN PATENT DOCUMENTS

| | | |
|---|---|---|
| WO | 2006/094228 A2 | 9/2006 |
| WO | 2010/002638 A2 | 1/2010 |
| WO | PCT/US2011/036562 | 5/2011 |

OTHER PUBLICATIONS

International Search Report received in related PCT Application No. PCT/US2011/036562; Oct. 10, 2011.
Written Opinion of the International Searching Authority received in related PCT Application No. PCT/US2011/036562; Oct. 10, 2011.

* cited by examiner

*Primary Examiner* — Michael S McNally
(74) *Attorney, Agent, or Firm* — ALG Intellectual Property, LLC (57) ABSTRACT

A computer-implemented method for creating customized confidence bands for use in malware detection may include 1) identifying a portal for receiving executable content, 2) identifying metadata relating to the portal, 3) analyzing the metadata to determine what risk executable content received via the portal poses, and then 4) creating, based on the analysis, a confidence band to apply during at least one disposition of executable content received via the portal. Various other methods, systems, and computer-readable media are also disclosed.

20 Claims, 8 Drawing Sheets

SYSTEMS AND METHODS FOR CREATING CUSTOMIZED CONFIDENCE BANDS FOR USE IN MALWARE DETECTION

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems. In an attempt to evade detection, malicious programmers may inject malware into or among legitimate programs.

Many security software companies attempt to combat malware by creating and deploying malware signatures (e.g., hash functions that uniquely identify malware) to their customers on a regular basis. However, a significant amount of malware has not yet been identified and therefore cannot be detected using traditional signature-based malware-detection mechanisms, particularly since malware authors may regularly modify their malware in an attempt to circumvent commonly employed signature-based malware-detection mechanisms.

In addition to or as an alternative to signature-based approaches, security software companies may utilize a variety of heuristics to classify files or programs (e.g., as malware or as safe) based on various characteristics and/or behaviors. Unfortunately, heuristic-based classification methods may result in an unacceptable number of false positives and/or false negatives. As such, the instant disclosure identifies a need for improved malware-detection mechanisms and techniques.

SUMMARY

As will be described in greater detail below, the instant disclosure generally relates to systems and methods for creating customized confidence bands for use in malware detection. In one example, the systems described herein may accomplish such a task by 1) identifying a portal (such as an Internet browser, email client, peer-to-peer client, chat client, etc.) capable of receiving executable content, 2) identifying metadata relating to the portal, 3) analyzing the metadata to determine what risk executable content received via the portal poses, and then 4) creating, based on the analysis, a confidence band to apply during at least one disposition of executable content received via the portal.

In some examples, the metadata may identify the number of executable objects that have originated from the portal, a popularity level of the portal (e.g., the number of users of the portal and/or frequency of use), and/or the incidence of untrusted executable objects that originate from the portal (e.g., the frequency with which executable objects downloaded from the portal are flagged by a security system). The systems described herein may gather such metadata from a variety of sources, such as a plurality of instances of the portal (e.g., from various installations of the portal on various users' systems). In some examples, the portal may include an executable object (such as a process, executable file, etc.) capable of creating an additional executable object (by, e.g., downloading the additional executable object, thereby creating a copy on a local system).

In one example, the systems described herein may create the confidence band based on one or more user configurations applicable to the portal. For example, a user, administrator, and/or a security vendor may set parameters for certain portals and/or classes of portals based on known traits of the portals and/or classes of portals. In some examples, the confidence band may apply to a class of portals (e.g., Internet browsers as a whole, as opposed to a specific Internet browser).

Upon creating the confidence band, the systems described herein may apply the same by 1) identifying an executable object that originated from the portal associated with the confidence band (e.g., an executable file downloaded from the portal) and 2) applying the confidence band during a disposition of the executable object (by, e.g., using the confidence band in conjunction with an analysis of the executable object to determine what security action, if any, to take with respect to the executable object). For example, the systems described herein may determine that a risk score (either independently generated or received from a reputation service) associated with the executable object results in the executable object being classified as safe, malicious, or indeterminate within the confidence band.

As will be explained in detail below, the systems and methods described herein may enable the customized disposition of executable objects based on a portal of origin. By using customized confidence bands during the disposition of executable objects, these systems and methods may enhance existing heuristic-based malware-detection techniques, potentially reducing false negatives and/or false positives and thereby improving security and/or user experience.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
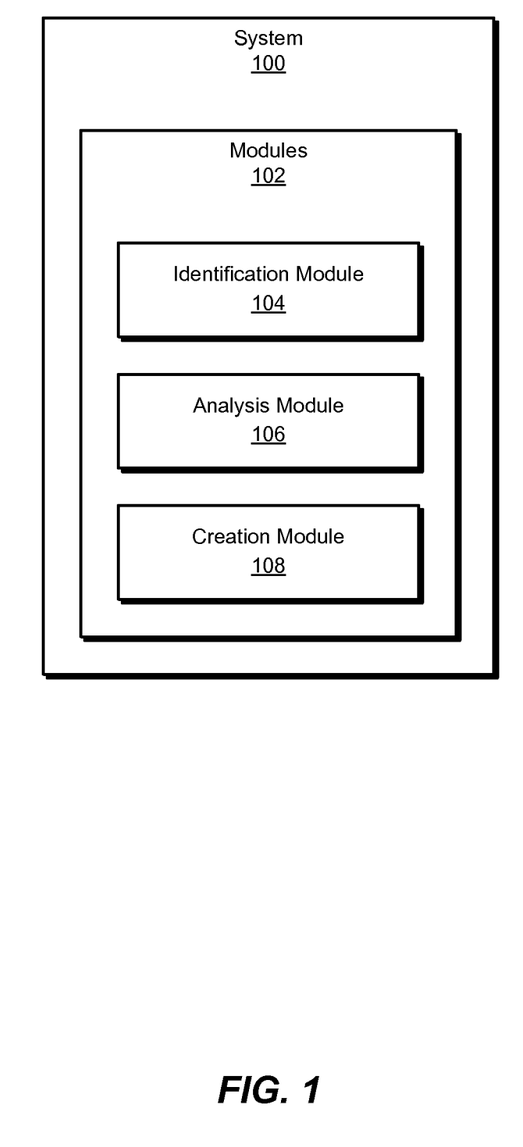
FIG. 1 is a block diagram of an exemplary system for creating customized confidence bands for use in malware detection.
Figure 2:
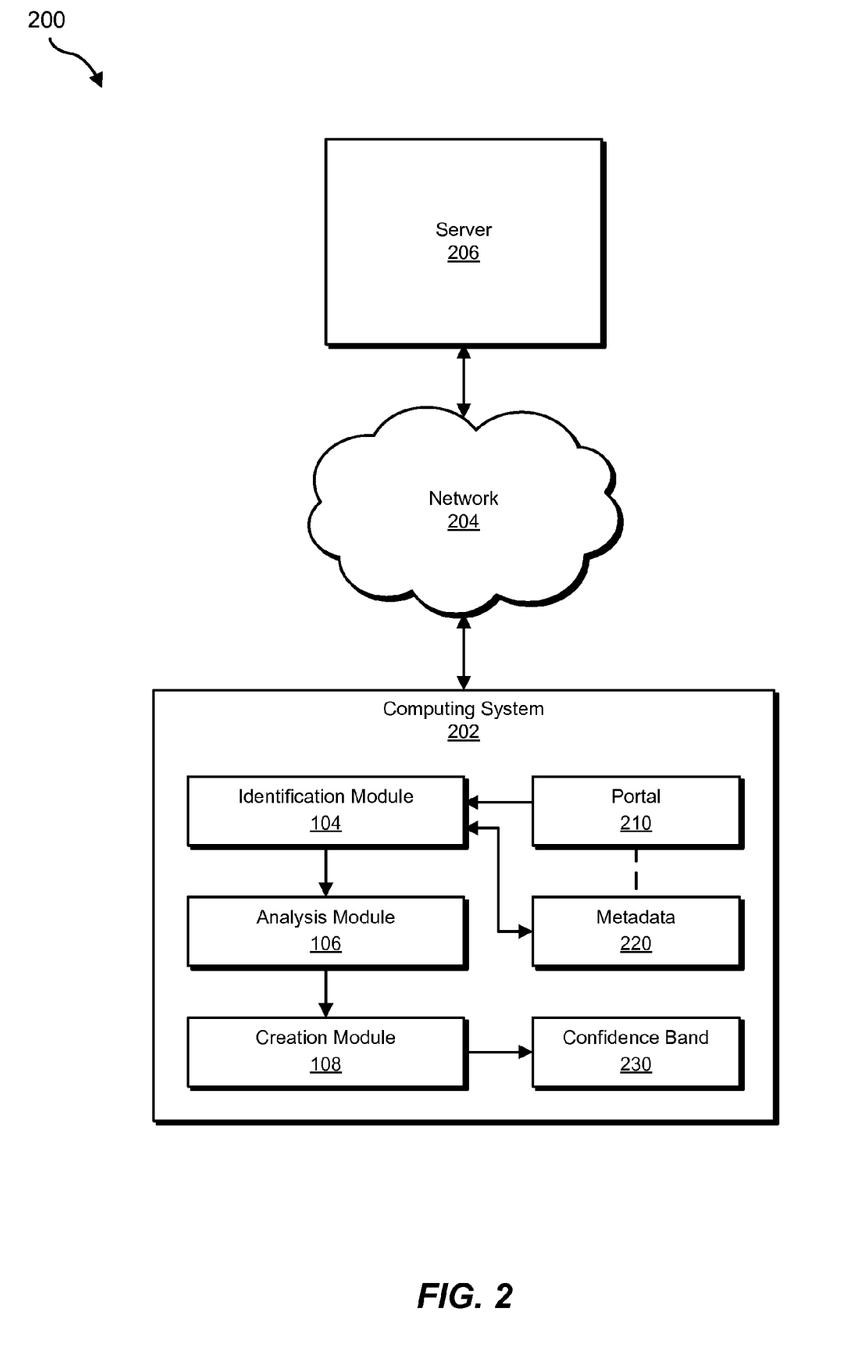
FIG. 2 is a block diagram of an exemplary system for creating customized confidence bands for use in malware detection.
Figure 4:
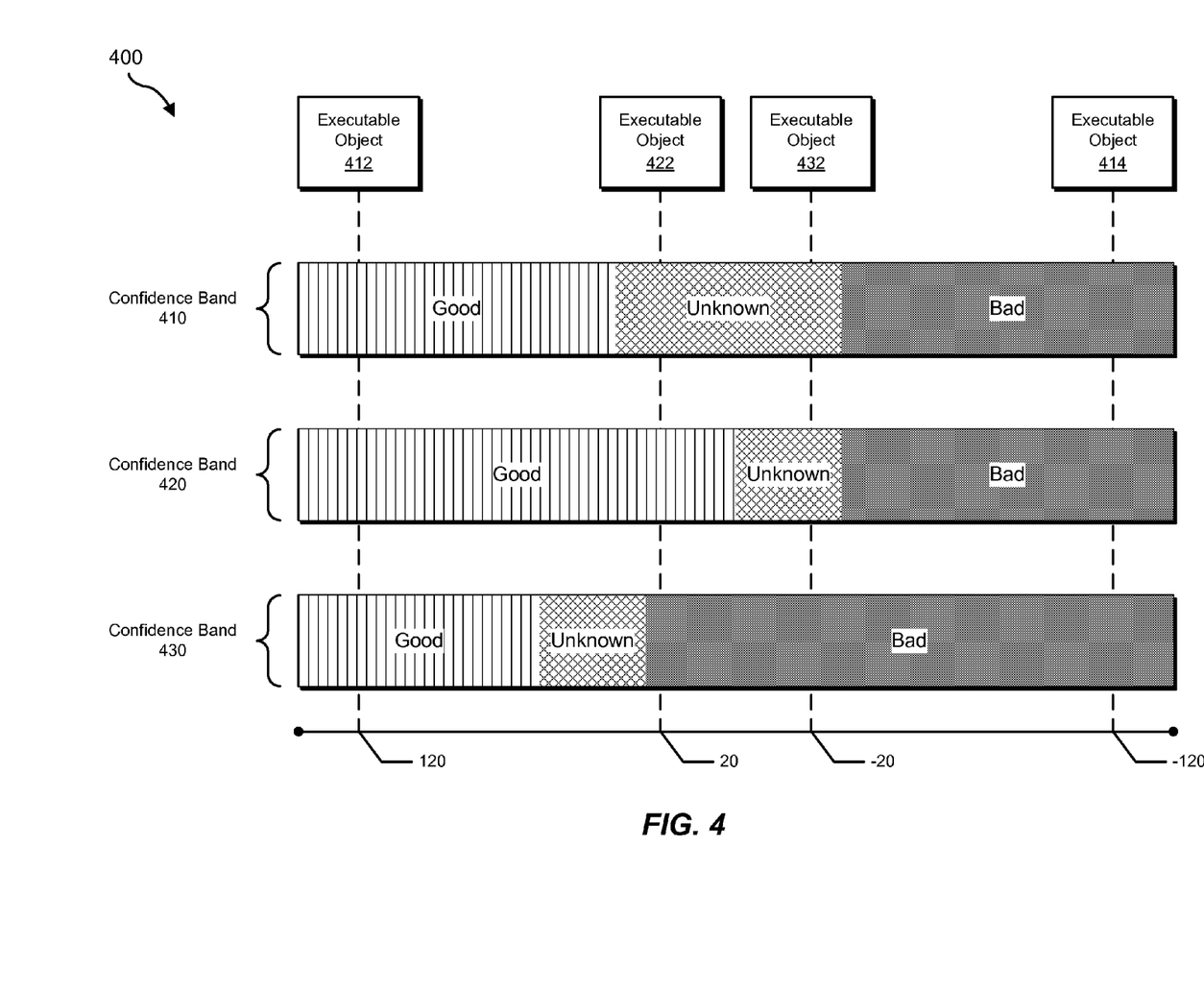
FIG. 4 is a diagram of exemplary customized confidence bands for malware detection.
Figure 5:
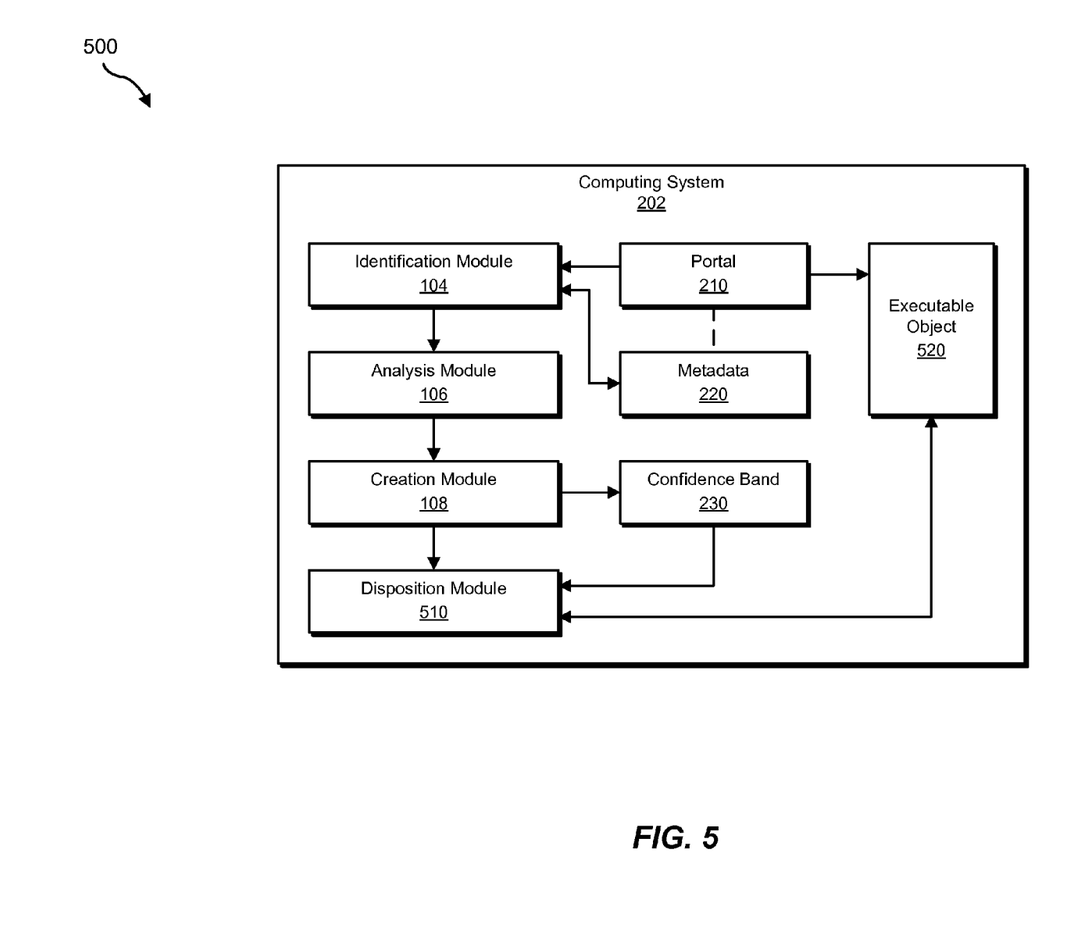
FIG. 5 is a block diagram of an exemplary system for creating customized confidence bands for use in malware detection.

The following will provide, with reference to FIGS. 1, 2, and 5, detailed descriptions of exemplary systems for creating customized confidence bands for use in malware detection. Detailed descriptions of corresponding computer-implemented methods will also be provided in connection with FIGS. 3, 4, and 6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for creating customized confidence bands for use in malware detection. As illustrated in this figure, exemplary system 100 may include one or more modules 102 for performing one or more tasks. For example, and as will be explained in greater detail below, exemplary system 100 may include an identification module 104 programmed to 1) identify a portal for receiving executable content and 2) identify metadata relating to the portal. Exemplary system 100 may also include an analysis module 106 programmed to analyze the metadata to determine what risk executable content received by the portal poses. Exemplary system 100 may also include a creation module 108 programmed to create a confidence band based on such an analysis to apply during one or more dispositions of executable content received via the portal. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing system 202 illustrated in FIG. 2, computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 in FIG. 2. As shown in FIG. 2, system 200 may include a computing system 202 in communication with a server 206 via a network 204. In one embodiment computing system 202 may include modules 102 from FIG. 1 (e.g., identification module 104, analysis module 106, and creation module 108).

In one example, and as will be described in greater detail below, modules 102 may be programmed to (as part of, e.g., security software installed on computing system 202) 1) identify a portal (e.g., portal 210) on computing system 202 that is capable of receiving executable content (e.g., from server 206 via network 204), 2) identify metadata (e.g., metadata 220) relating to the portal, 3) analyze the metadata to determine what risk executable content received via the portal poses, and then 4) create a confidence band based on the analysis to apply during one or more dispositions of executable content received via the portal. Modules 102 may then apply the confidence band during a disposition of an executable object originating from the portal (by, e.g., using the confidence band in conjunction with an analysis of the executable object to determine what security action, if any, to take with respect to the executable object).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Server 206 generally represents any type or form of computing device that is capable of transmitting executable content and/or instructions for generating executable content. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing system 202 and server 206.

Figure 3:
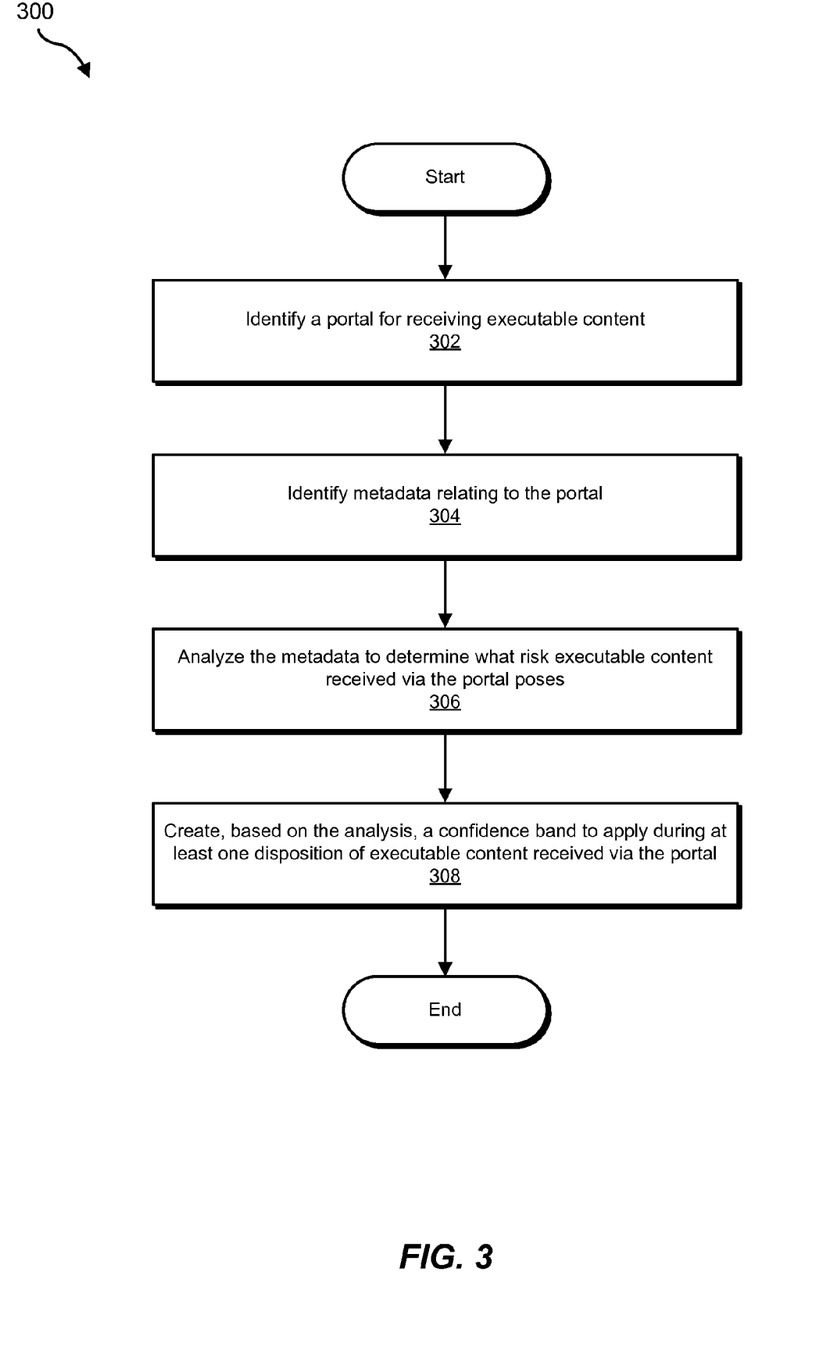
FIG. 3 is a flow diagram of an exemplary method for creating customized confidence bands for use in malware detection.

FIG. 3 is a flow diagram of an exemplary computer-implemented method 300 for creating customized confidence bands for use in malware detection. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a portal for receiving executable content. For example, identification module 104 may, as part of computing system 202 in FIG. 2, identify portal 210.

As used herein, the term "executable content" may refer to any executable file and/or set of executable instructions. Additionally or alternatively, "executable content" may refer to any data capable of being transformed into and/or interpreted as executable instructions. For example, "executable content" may refer to an archive file containing an executable file, a script with instructions executable by an interpreter, a library object, etc. In some examples, "executable content" may refer to content that may cause a portal to create, generate, and/or save executable instructions.

As used herein, the term "portal" may generally refer to any object and/or path capable of receiving executable content. Examples of portals include, without limitation, Internet browsers (e.g., browsers capable of downloading executable content from the Internet), such as MOZILLA FIREFOX, MICROSOFT INTERNET EXPLORER or SAFARI, email clients (e.g., clients capable of receiving and/or downloading executable content as an attachment), such as MICROSOFT OUTLOOK, peer-to-peer clients (e.g., distributed and/or decentralized file sharing clients), such as UTORRENT, LIMEWIRE, or AZUREUS, chat clients (e.g., clients capable of receiving executable content as an attachment and/or receiving a link to executable content), such as SKYPE, AOL INSTANT MESSENGER, or GOOGLE TALK, or the like.

In some examples, the portal may include an executable object (i.e., any object that includes executable content) capable of creating an additional executable object (such as an executable file, process, etc). In this example, an executable object may "create" an additional executable object by creating a local copy of an executable object received from another location (e.g., across a network). For example, a portal may include an executable object capable of downloading an additional executable object.

The systems described herein may identify the portal in step 302 in any suitable manner. For example, identification module 104 may detect an attempt to create a new executable object and may identify portal 210 in FIG. 2 as the source of the attempt. In this example, identification module 104 may monitor I/O operations and/or network traffic associated with portal 210. Additionally or alternatively, identification module 104 may receive a message (e.g., from an intrusion prevention system) identifying a newly created executable object originating from portal 210. In other examples, identification module 104 may identify the portal by simply reading from a configuration file that identifies the portal (e.g., as a portal requiring a customized confidence band).

In some examples, identification module 104 may identify an application as the portal. Additionally or alternatively, identification module 104 may identify an executable component (e.g., a plug-in, a library, an extension, etc.) as the portal. For example, if an Internet browser includes a plug-in capable of downloading executable content, identification module 104 may identify the Internet browser and/or may identify the plug-in.

Returning to FIG. 3, at step 304 one or more of the systems described herein may identify metadata relating to the portal identified in step 302. For example, at step 304 identification module 104 may, as part of computing system 202 in FIG. 2, identify metadata 220 relating to portal 210.

As used herein, the term "metadata relating to the portal" may refer to any data useful in the disposition of executable content received and/or created by the portal. Examples of such metadata include, without limitation, statistics relating to the portal and/or executable content received by the portal, information indicating the number of executable objects originating from the portal (e.g., information that indicates that the portal has created 1000 executable objects), information indicating the incidence of untrusted executable objects originating from the portal (e.g., information that indicates that the portal has created 100 untrusted executable objects and/or that 10% of executable objects created by the portal have been untrusted, etc.), information indicating the popularity level of the portal (e.g., how widely the portal is adopted, how much the portal is used, etc.), or the like.

In some examples, identification module 104 may identify metadata relating to the portal by gathering metadata on a plurality of instances of the portal. For example, identification module 104 may identify, gather, and/or aggregate metadata from various installations of the portal on various users' systems.

Identification module 104 may perform step 304 in any suitable manner. In some examples, identification module 104 may identify metadata relating to the portal in question by monitoring the portal. Additionally or alternatively, identification module 104 may identify metadata relating to the portal in question by reading from a database that includes the metadata.

In some examples, identification module 104 may receive the metadata from another application. For example, identification module 104 may receive information indicating the popularity of the portal from security software capable of tracking identified instances of the portal, such as NORTON INSIGHT. Likewise, identification module 104 may receive information indicating the number of executable objects and/or the ratio of infected and/or untrusted executable objects originating from the portal from security software.

Returning to FIG. 3, at step 306 one or more of the systems described herein may analyze the metadata identified in step 304 to determine what risk executable content received via the portal poses. For example, at step 306 analysis module 106 may, as part of computing system 202 in FIG. 2, analyze metadata 220 to determine what risk executable content received via portal 210 poses to computing system 202.

Analysis module 106 may perform step 306 in any suitable manner. For example, analysis module 106 may calculate a risk score and/or a series of risk factors based on the metadata identified in step 304. For example, analysis module 106 may set a higher risk score for a higher ratio of untrusted executable objects historically received via the portal. Additionally or alternatively, analysis module 106 may set a higher risk score for a less popular portal. In some examples, analysis module 106 may analyze historical data relating to the disposition of executable objects received via the portal using statistical techniques, trending over time, version number information, etc.

At step 308, one or more of the systems described herein may create a confidence band based on the analysis performed in step 306 to apply during one or more dispositions of executable content received via the portal. For example, at step 308 creation module 108 may, as part of computing system 202 in FIG. 2, create confidence band 230 to apply during one or more dispositions of executable content received via portal 210.

As used herein, the term "disposition" may refer to any process of classification and/or remediation. For example, as will be described in greater detail below, a disposition of an executable file may involve classifying the file as safe, malicious, or indeterminate. In some examples, as part of a disposition an executable object may receive a score indicating the risk that the executable object poses.

As used herein, the term "confidence band" may refer to any set of ranges and/or thresholds for different possible outcomes and/or classifications of a disposition. For example, FIG. 4 is a diagram of exemplary customized confidence bands for malware detection in a system 400. As illustrated in FIG. 4, executable objects 412, 414, 422, and 432 may each have received a risk score (assigned, e.g., by security software after an analysis) of 120, -120, 20, and -20, respectively. In this example, confidence bands 410, 420, and 430 may each correspond to a different portal.

As illustrated in FIG. 4, executable object 412 may fall within a "Good" classification for each confidence band. Likewise, executable object 414 may fall within a "Bad" classification for each confidence band. However, executable object 422 may fall into an "Unknown," "Good," or "Bad" classification depending on whether confidence band 410, 420, or 430 applies. Likewise, executable object 432 may fall into an "Unknown" classification according to confidence bands 410 and 420 but into a "Bad" classification according to confidence band 430. Accordingly, the disposition of executable objects 422 and 432 may depend on which portal originated them. While FIG. 4 illustrates three possible classifications, as will be described in greater detail below, confidence bands may cover a variety of classifications, remediations, and/or other security actions.

Creation module 108 may create the confidence band in a variety of ways. For example, creation module 108 may create a confidence band to apply to a class of portals. As mentioned earlier, the portal may include any of a variety of applications, such as an Internet browser, an email client, a peer-to-peer client, etc. Creation module 108 may accordingly create a confidence band to apply to a specific portal (e.g., MOZILLA FIREFOX). Additionally or alternatively, creation module 108 may create a confidence band to apply to a class of portals (e.g., all Internet browsers, including MOZILLA FIREFOX, MICROSOFT INTERNET EXPLORER, SAFARI, GOOGLE CHROME, etc.).

In some examples, creation module 108 may create the confidence band based on at least one user configuration applicable to the portal. For example, a user, administrator, and/or a security vendor may set parameters for certain portals and/or classes of portals based on known traits of the portals and/or classes of portals. For example, a security vendor may identify a security hole in the portal and anticipate that the security hole will likely be widely exploited. Accordingly, the security vendor may add a parameter to the configuration of the confidence band for the portal to classify executable content originating from the portal more harshly.

Using FIG. 4 as an example, creation module 108 may create confidence band 410 for the disposition of executable content originating from Internet browsers (as a class). In this example, creation module 108 may set thresholds in confidence band 410 based on the average incidence of malware in executable content originating from Internet browsers. Creation module 108 may also create confidence band 420 for the disposition of executable content originating from email clients (as a class). In this example, creation module 108 may lower the threshold for "Good" executable content relative to confidence band 410 based on a lower incidence of malware in executable content originating from email clients. Furthermore, a user (such as a security vendor, an administrator, etc.) may submit a parameter to creation module 108 to reduce the range of "Unknown" executable content based on observations that malicious executable objects in email are generally filtered at gateways.

Creation module 108 may also create confidence band 430 for the disposition of executable content originating from peer-to-peer clients (as a class), again based on metadata analysis and user configuration. In this example, creation module 108 may expand the range of "Good" executable content based on a higher incidence of malware in executable content originating from peer-to-peer clients and may narrow the range of "Unknown" executable content in confidence band 430 according to a user configuration to aggressively reduce false negatives (e.g., an administrator may be less concerned with false negatives resulting from peer-to-peer downloads than with false negatives in the context of Internet browsing or emails). After step 308, method 300 may terminate.

Figure 6:
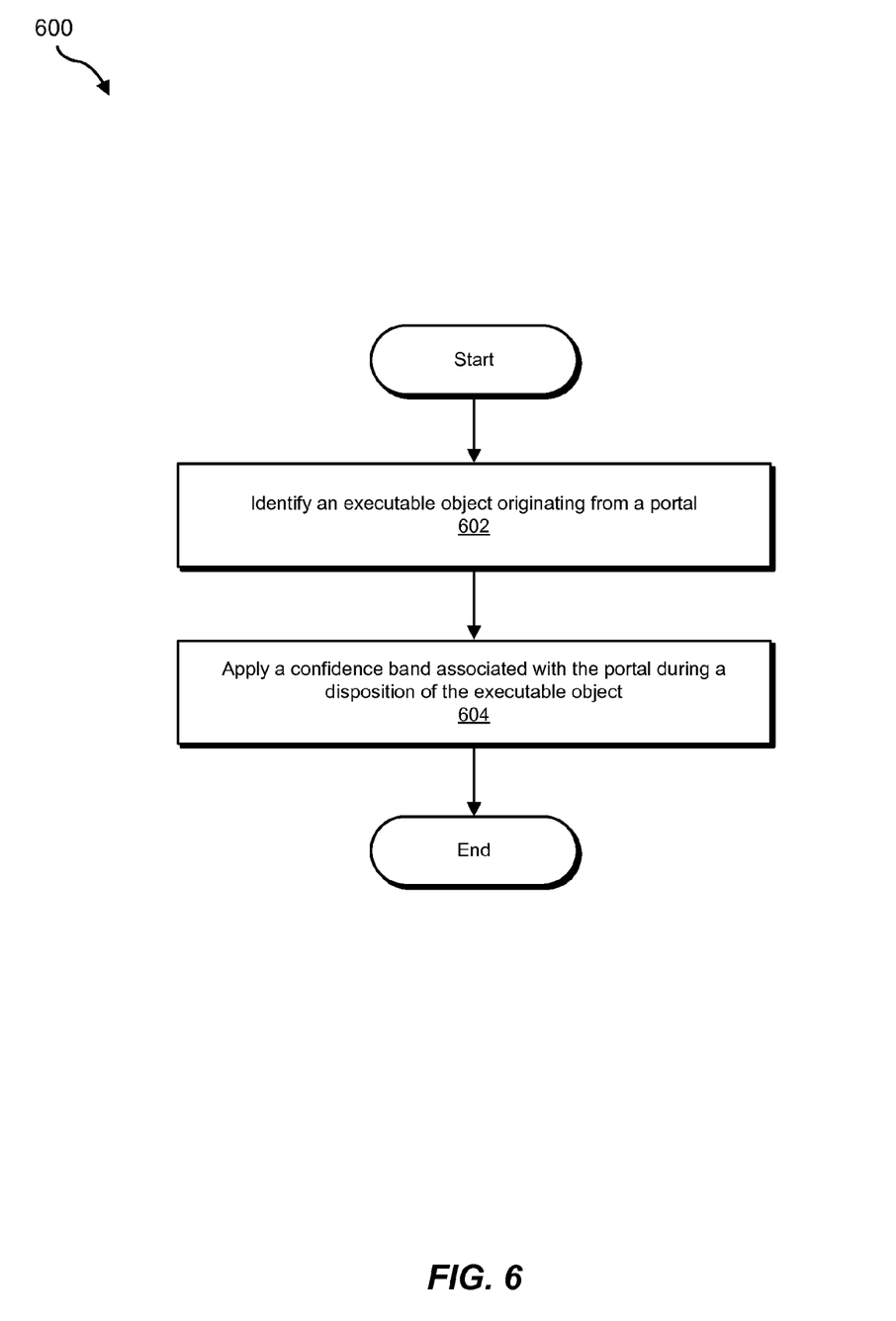
FIG. 6 is a flow diagram of an exemplary method for creating customized confidence bands for use in malware detection.

As detailed above, the systems described herein may apply confidence bands generated in accordance with exemplary method 300 in FIG. 3 during the disposition of executable objects originating from various portals. FIG. 6 is a flow diagram of an exemplary computer-implemented method 600 for applying such customized confidence bands in malware detection. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, and/or system 500 in FIG. 5.

As illustrated in FIG. 6, at step 602 one or more of the systems described herein may identify an executable object originating from a portal. For example, at step 602 disposition module 510 may, as part of computing system 202 in FIG. 5, identify an executable object 520 that originated from portal 210.

The systems described herein may perform step 602 in any suitable manner. For example, disposition module 510 may detect an attempt to create a new executable object and may identify portal 210 in FIG. 5 as the source of the attempt. In this example, disposition module 510 may monitor I/O operations and/or network traffic associated with portal 210. Additionally or alternatively, disposition module 510 may receive a message (e.g., from an intrusion prevention system) identifying a newly created executable object originating from portal 210.

At step 604, one or more of the systems described herein may apply a confidence band associated with the portal in question during a disposition of the executable object. For example, at step 604 disposition module 510 may, as part of computing system 202 in FIG. 5, apply a confidence band 230 associated with portal 210 during a disposition of executable object 520. Upon completion of step 604, method 600 may terminate.

The systems described herein may perform step 604 in any suitable manner. For example, disposition module 510 may use one or more heuristics in an analysis of various behaviors and/or characteristics of executable object to assign the executable object a risk score. Additionally or alternatively, disposition module 510 may identify a risk score previously assigned (by, e.g., a reputation service) to the executable object. Disposition module 510 may then classify the executable object by determining where the risk score assigned to the executable object falls within confidence band 230.

For example, disposition module 510 in FIG. 5 may identify an executable object 422 in FIG. 4 received via a peer-to-peer client. In this example, disposition module 510 may retrieve (using, e.g., a hash-based lookup system) a risk score (in this example, 20) previously assigned to executable object 422 from a reputation service. Disposition module 510 may then apply confidence band 430 to executable object 422 during a disposition of the same since this object originated from a peer-to-peer client, as opposed to an Internet browser (confidence band 410) or email client (confidence band 420). In this example, disposition module 510 may classify executable object 422 as "Bad" since its risk score (in this example, 20) falls within the lower band of confidence band 430.

As mentioned earlier, the disposition of an executable object may include a variety of classifications and/or remediations. For example, the disposition of an executable object may include determining that the executable object is safe. In this example, disposition module 510 may place the executable object on a whitelist, allow execution of the executable object, remove the executable object from quarantine, and/or perform any other suitable security action. In another example, the disposition of an executable object may include determining that the executable object is malicious (e.g., infected, deceptive, etc.). In this example, disposition module 510 may report the executable object to a user, administrator, and/or security vendor, place the executable object in quarantine, remove or delete the executable object, block execution of the executable object, and/or perform any other suitable security action. In an additional example, the disposition of the executable object may include determining that the safety of an executable object is unknown. In this example, disposition module 510 may restrict privileges associated with the executable object, monitor the executable object, and/or perform any other suitable security action. In some examples, the disposition of an executable object (as well as the thresholds and/or ranges of the confidence band) may include a greater granularity of classifications along with any suitable remediations.

As described above, the systems and methods described herein may enable the customized disposition of executable objects based on a portal of origin. By using customized confidence bands during the disposition of executable objects, these systems and methods may enhance existing heuristic-based malware-detection techniques, potentially reducing false negatives and/or false positives and thereby improving security and/or user experience.

Figure 7:
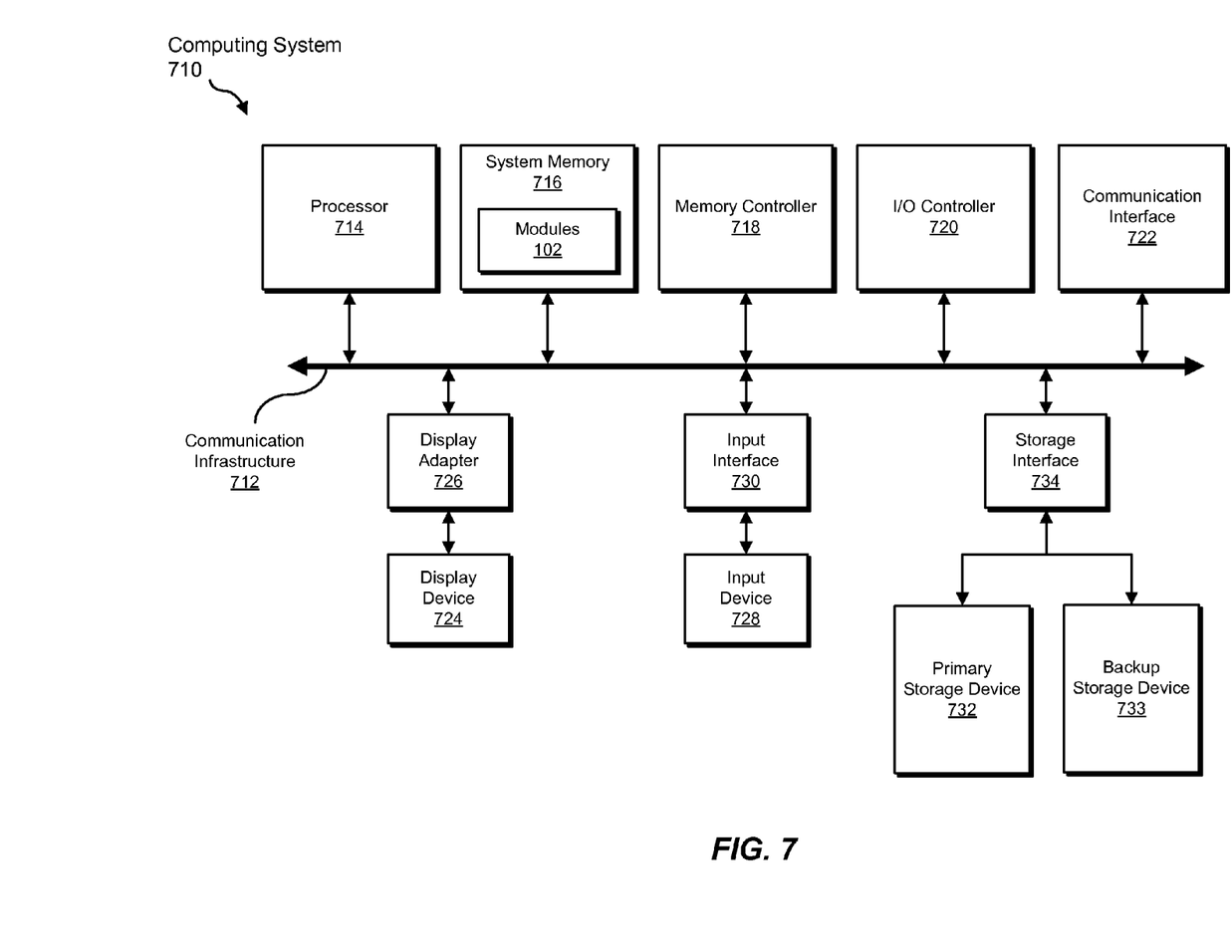
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, gathering, analyzing, creating, applying, and/or determining steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an input/output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, gathering, analyzing, creating, applying, and/or determining.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, gathering, analyzing, creating, applying, and/or determining steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, gathering, analyzing, creating, applying, and/or determining steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, gathering, analyzing, creating, applying, and/or determining steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, gathering, analyzing, creating, applying, and/or determining steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
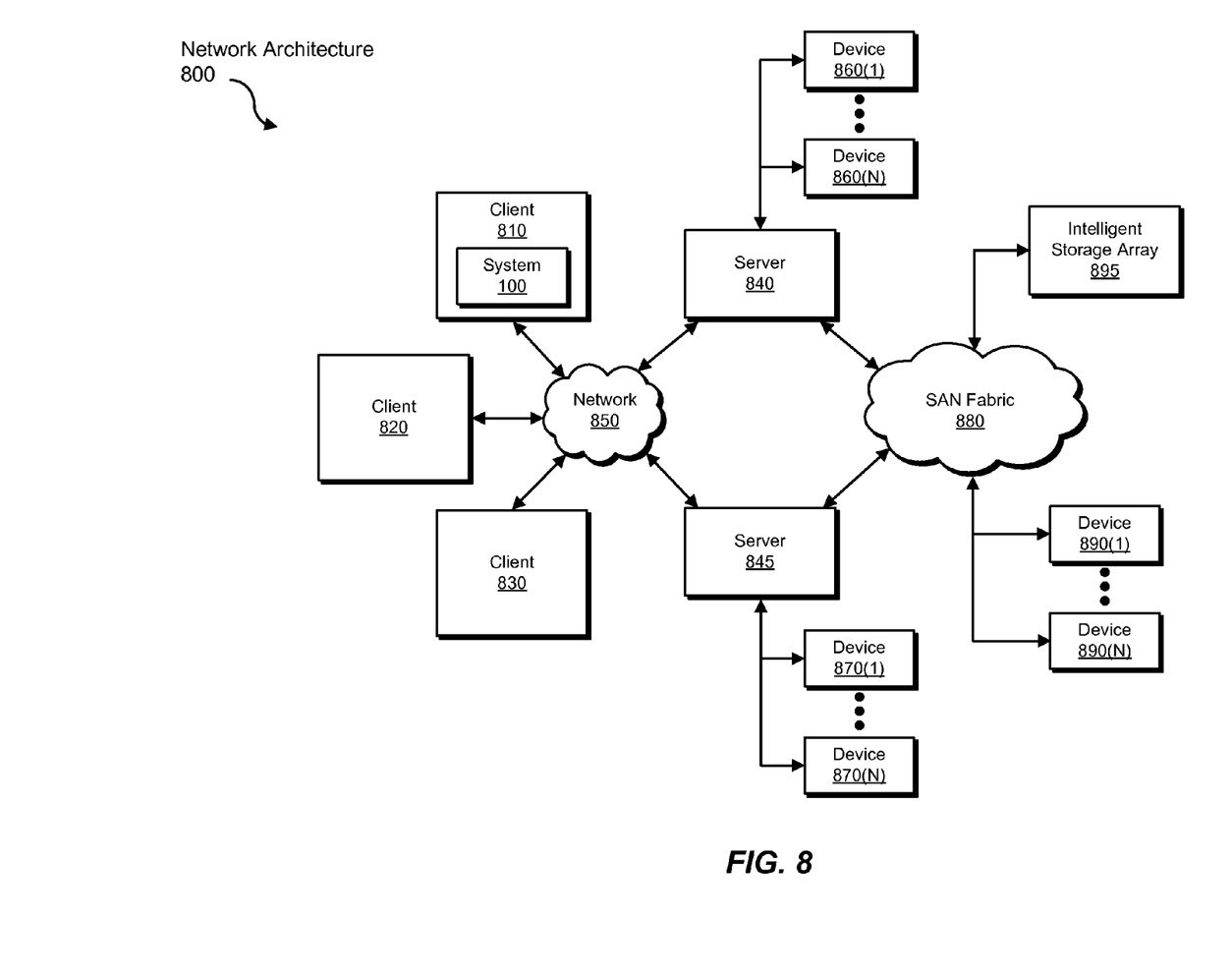
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, gathering, analyzing, creating, applying, and/or determining steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for creating customized confidence bands for use in malware detection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, the systems described herein may be deployed within a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a system for accurately applying security heuristics to executable content based on a portal of origin.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating customized confidence bands for use in malware detection, at least a portion of the method being performed by a computing device comprising at least one processor, the method comprising:
   identifying a portal for receiving executable content;
   identifying metadata relating to the portal;
   analyzing the metadata to determine what risk executable content received via the portal poses;
   creating, based on the analysis, a confidence band to apply during at least one disposition of executable content received via the portal;
   adjusting a sub-band of the confidence band based on an indication of how susceptible the portal is to malware.

2. The computer-implemented method of claim 1, further comprising:
   identifying an executable object that originated from the portal;
   applying the confidence band during a disposition of the executable object.

3. The computer-implemented method of claim 2, wherein applying the confidence band comprises:
identifying a risk score assigned to the executable content;
classifying the executable content by determining where the risk score assigned to the executable content falls within the confidence band.

4. The computer-implemented method of claim 1, wherein adjusting the sub-band comprises adjusting the sub-band based on a level of incidence of malware associated with the portal.

5. The computer-implemented method of claim 4, wherein:
the sub-band identifies a portion of the confidence band indicating that executable content is good;
adjusting the sub-band comprises expanding the sub-band based on a lower incidence of malware in executable content associated with the portal.

6. The computer-implemented method of claim 4, wherein:
the sub-band identifies a portion of the confidence band indicating that executable content is bad;
adjusting the sub-band comprises expanding the sub-band based on a higher incidence of malware in executable content associated with the portal.

7. The computer-implemented method of claim 4, wherein the sub-band identifies a portion of the confidence band indicating that trustworthiness of executable content is unknown.

8. The computer-implemented method of claim 1, wherein identifying the metadata comprises gathering metadata on a plurality of instances of the portal.

9. The computer-implemented method of claim 1, wherein creating the confidence band comprises creating the confidence band based on at least one user configuration applicable to the portal.

10. A system for creating customized confidence bands for use in malware detection, the system comprising:
an identification module programmed to:
identify a portal for receiving executable content;
identify metadata relating to the portal;
an analysis module programmed to analyze the metadata to determine what risk executable content received via the portal poses;
a creation module programmed to:
create, based on the analysis, a confidence band to apply during at least one disposition of executable content received via the portal;
adjust a sub-band of the confidence band based on an indication of how susceptible the portal is to malware;
at least one processor configured to execute the identification module, the analysis module, and the creation module.

11. The system of claim 10, further comprising a disposition module programmed to:
identify an executable object that originated from the portal;
apply the confidence band during a disposition of the executable object.

12. The system of claim 11, wherein the disposition module is programmed to apply the confidence band by:
identifying a risk score assigned to the executable content;
classifying the executable content by determining where the risk score assigned to the executable content falls within the confidence band.

13. The system of claim 10, wherein the creation module is programmed to adjust the sub-band based on a level of incidence of malware associated with the portal.

14. The system of claim 13, wherein:
the sub-band identifies a portion of the confidence band indicating that executable content is good;
the creation module is programmed to adjust the sub-band by expanding the sub-band based on a lower incidence of malware in executable content associated with the portal.

15. The system of claim 13, wherein:
the sub-band identifies a portion of the confidence band indicating that executable content is bad;
the creation module is programmed to adjust the sub-band by expanding the sub-band based on a higher incidence of malware in executable content associated with the portal.

16. The system of claim 13, wherein the sub-band identifies a portion of the confidence band indicating that trustworthiness of executable content is unknown.

17. The system of claim 10, wherein the identification module is programmed to identify the metadata by gathering metadata on a plurality of instances of the portal.

18. The system of claim 10, wherein the creation module is programmed to create the confidence band by creating the confidence band based on at least one user configuration applicable to the portal.

19. A non-transitory computer-readable-storage medium comprising one or more computer-executable instructions that, when executed by at least one processor of a computing device, cause the computing device to:
identify a portal for receiving executable content;
identify metadata relating to the portal;
analyze the metadata to determine what risk executable content received via the portal poses;
create, based on the analysis, a confidence band to apply during at least one disposition of executable content received via the portal;
adjust a sub-band of the confidence band based on an indication of how susceptible the portal is to malware.

20. The computer-readable-storage medium of claim 19, wherein the one or more computer-executable instructions cause the computing device to adjust the sub-band based on a level of incidence of malware associated with the portal.

* * * * *